Figure 4:
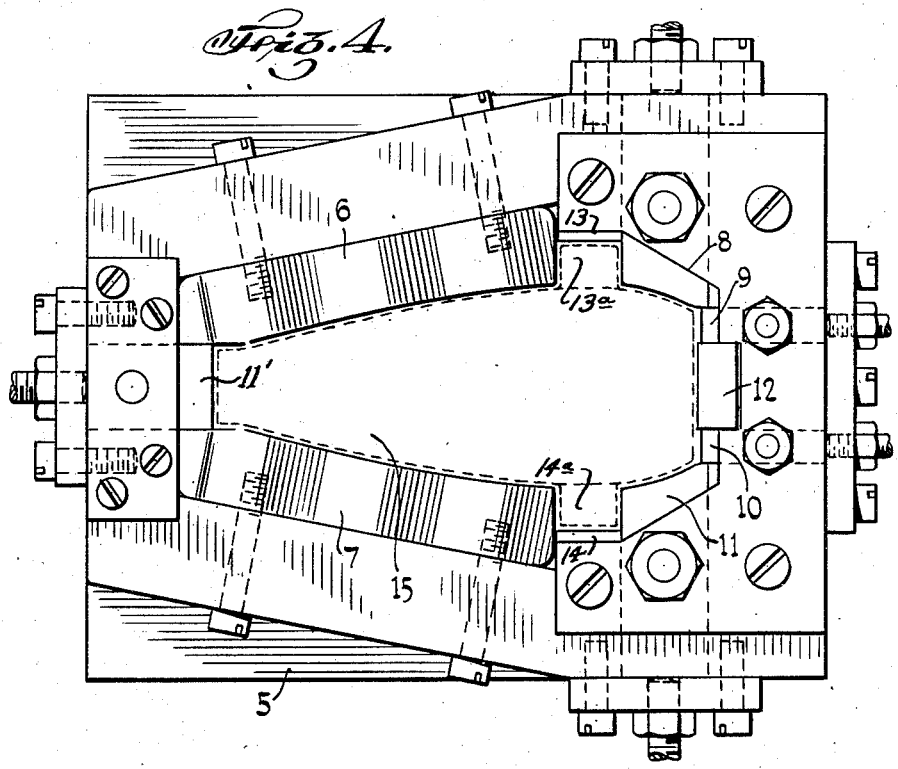

Sept. 18, 1945.　　　G. H. PHELPS ET AL　　　2,385,160
FINISHING WELDED ARTICLE
Filed Jan. 22, 1942　　　2 Sheets-Sheet 1
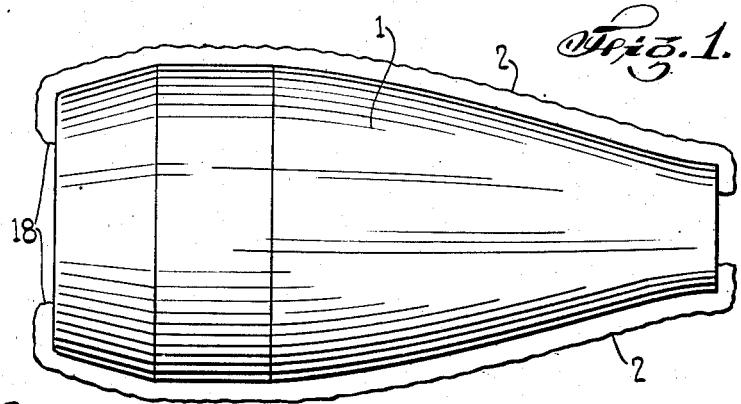
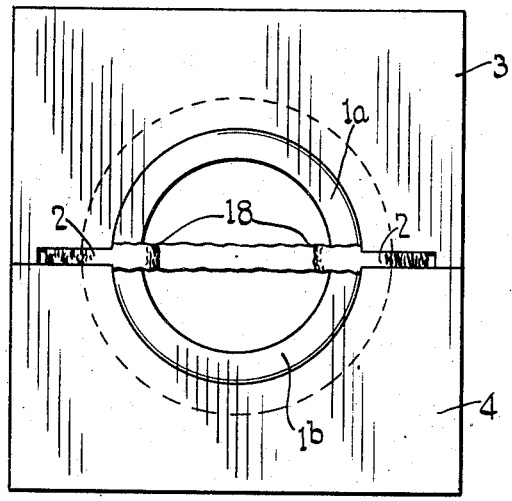
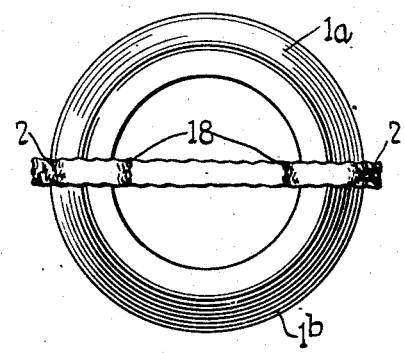
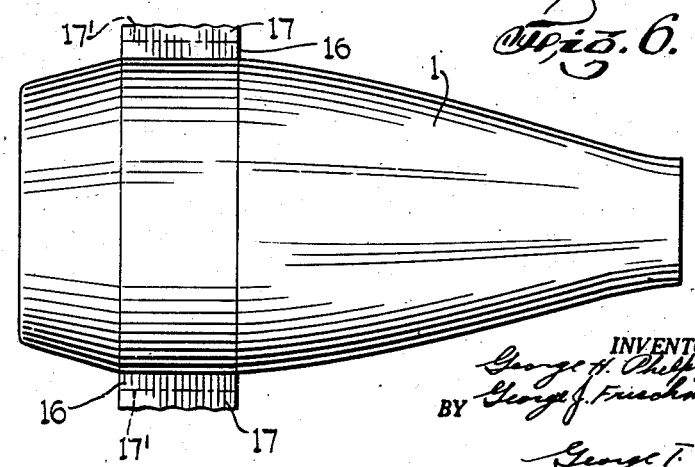
INVENTOR.
George H. Phelps and
BY George J. Frischmann
George F. Gill
ATTORNEY Sept. 18, 1945.  G. H. PHELPS ET AL  2,385,160
FINISHING WELDED ARTICLE
Filed Jan. 22, 1942   2 Sheets-Sheet 2

INVENTOR.
George H. Phelps and
George J. Truschmann
BY
George T. Gill
ATTORNEY

Patented Sept. 18, 1945

2,385,160

UNITED STATES PATENT OFFICE 2,385,160

FINISHING WELDED ARTICLE

George H. Phelps, Floral Park, and George J. Frischmann, Queens Village, N. Y., assignors to Metropolitan Engineering Company, Brooklyn, N. Y., a corporation of New York Application January 22, 1942, Serial No. 427,731

10 Claims. (Cl. 29—148)

The invention herein disclosed relates to a method of finishing an article that is made by welding pieces of metal together, as by the electric resistance welding process, wherein metal is extruded at the joint, forming a burr.

In effecting a weld by the electric resistance welding process wherein the metal of each piece is compressed into the other, part of the metal is extruded at the joint and forms a burr running along the joint. These burrs must, except in some special cases where a smooth unbroken surface is not required, be removed from the article. In some cases, in addition to removing the burr, further finishing of the article is required which may take the form of machining operations.

The burr formed in such welding operations is not necessarily of uniform thickness or of uniform resistance to shear throughout. Furthermore, the burr on one side of a joint may have materially less resistance to shear than that on the opposite side of the joint or the opposite side of the article. Commonly, it is desirable to remove, by shearing, opposite burrs in a single operation as individual shearing of oppositely extending burrs introduces complications and increases the labor and manufacturing costs. However, because of the lack of uniform resistance to shear of burrs extending oppositely from a welded article, much difficulty has been encountered, particularly with certain articles, in preventing the article from becoming "cocked" in the shearing press with the result that a clean shear is not obtained, or the press is jambed.

It is an object of this invention to provide a method for finishing such articles, including the removal of burrs formed in welding, which eliminates the difficulties encountered because of unequal resistance to shear, or unequal shear pressure on the burrs. To this end the method primarily consists in removing the burrs in a plurality of stages, that is, in the first instance retaining a portion of the burr so located on the article as to prevent the article from shifting or becoming "cocked" in the shearing operation. The retained portion of the burr serves to position the article during the shearing operation and may be utilized in subsequent finishing operations as a key for keying the article in position while machining operations are being performed thereon.

Figure 5:
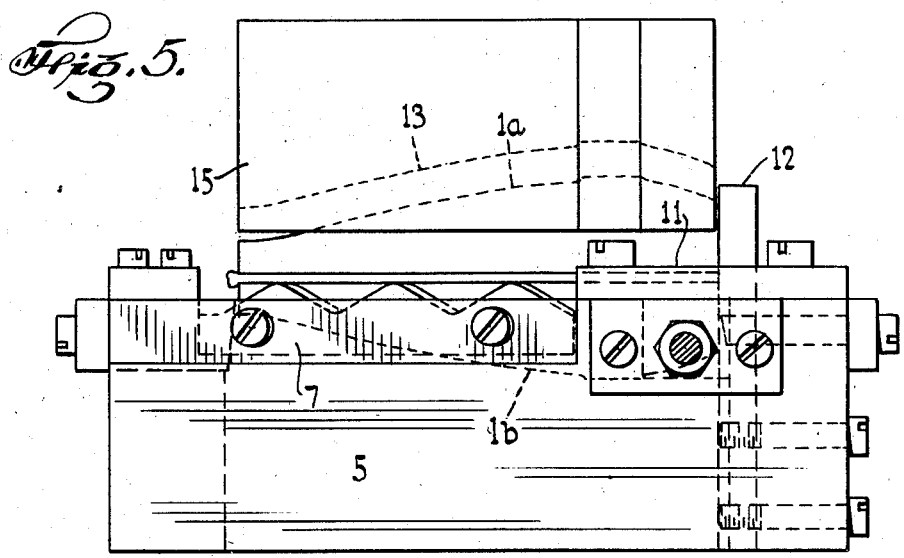

The method of this invention may be more clearly understood from the following detail description of the finishing of a welded article in accordance with the method. The accompanying drawings are referred to in this detailed description of one specific embodiment of the invention. The drawings include:

Fig. 1 which is a plan of an article formed from two longitudinally divided sections welded together;

Fig. 2 which is an end view of the same;

Fig. 3 which is an end view of the article between sizing dies;

Fig. 4 which is a plan of a shearing die with the punch thereover;

Fig. 5 which is a side elevation of the same; and

Fig. 6 which is a plan of the article before machining operations are performed thereon.

In Figs. 1 and 2 of the drawings there is disclosed a hollow article 1 that has been formed by welding two longitudinally divided halves 1a and 1b by the electric resistance welding process. In the welding operation the two longitudinally divided halves 1a and 1b of the article are placed in edged wedged relation. Each half is received in an electrode that has a recess therein complementary to the half received by the electrode. Pressure is applied on the electrodes to effect a pressure engagement of the edges of the two halves 1a and 1b. While the pieces are held between the electrodes and in pressure engagement, a heavy electric current is caused to flow between pieces. The pieces become heated, in the weld area, by the passage of the electric current to a point where the metal becomes plastic. Additional pressure is then applied to cause the metal of one piece to flow into and become ingrained with the metal of the other piece. This operation causes a burr 2 of the excess metal to be extruded at the joint. In finishing the article, the burr 2 must be removed.

After the burr has cooled, the article is placed between sizing dies 3 and 4. These sizing dies are in a press capable of exerting a high pressure. The dies have recesses therein to receive the article, the recesses being accurate complements of the ultimate shape of the article. When the dies are brought together with the article therebetween and sufficient pressure is applied the article is caused to conform to the recesses in the dies. Thus, slight inaccuracies are eliminated. The sizing dies 3 and 4 are arranged such that when they are related as indicated in Fig. 3 to properly size the article, the burr 2 on the article is compressed or slightly flattened. This compressing of the burr forms a flat surface on each side of the burr which materially aids in the shearing operation that follows the sizing of the article.

The shearing die, for shearing the external burr on the particular article illustrated is disclosed in Figs. 4 and 5. The die consists of a block 5 having an opening therethrough, through which the article may pass. This block carries cutting blades 6, 7, 8, 9, 10, 11 and 11'. Also carried by the block is a stop 12 which extends from the surface thereof. The cutting blades are related and arranged in accordance with the perimeter of the article at the plane of the burr, except at two opposite sections 13 and 14, between the cutting blades 6 and 8 and 7 and 11 respectively. The cutting blades 6 and 8 are spaced apart and have end cutting edges extending transversely. In like manner the blades 7 and 11 are spaced apart and have end cutting edges extending transversely. The portions of the burr on an article within the die that overlie these sections 13 and 14 will not be sheared as the article is forced through the die but will be retained on the article.

The block 5 is secured to the base of a press. In operation the article is placed within the die, the end thereof abutting against the stop 12 to position the article on the die. In this position, the burr lies on the cutting blades of the die and the edges of the cutting blades are against the article at the burr.

Cooperating with the shearing die there is a punch 15, the punch being carried by the movable element or ram of the press. This particular punch consists of a solid block of metal having a depression 13 formed therein which is complementary to a longitudinally divided section of the article, except at two places. At opposite sides of this punch there are extensions 13a and 14a which overlie the sections 13 and 14 of the shearing die. As previously stated, in the shearing operation, the article is placed in the die with the burr thereon lying on the cutting blades of the die. The punch is then brought down to force the article through the cutting die. As the article is forced through the cutting die, the burr is sheared from the article, except the retained portions overlying the sections 13 and 14. In forcing the articles through the shearing die, the punch engages the retained portions of the burr at the extensions 13a and 14a and prevents the article from rotating about its longitudinal axis and becoming "cocked" in the die, or from going through the die other than with the plane of the burr parallel to the plane of the die.

After the article has been forced through the shearing die, all of the burr, externally of the article, is removed, except the retained portions 16 and 17. One or both of the retained portions or extensions 16 and 17 may be used as a key for keying the article during subsequent machining operations. In general, a small portion of one of the extensions of the burr is sufficient for this purpose and in such cases the extension 16 may be removed and the extension 17 removed in part to the broken line 17'.

Considerable force is required on the cutting tools utilized for removing, for example, the burr 18 that extends inwardly of the article. The normal holding or clamping pressure exerted, for example, by chucks in a lathe is insufficient to securely hold some articles of this kind during the cutting operation. It has, therefore, been found expedient to provide a key-way in one of the jaws of such chucks for engaging the retained portion of the burr. The retained portion of the burr acting as a key and engaging a key-way in a chuck prevents the article from slipping in the chuck, i. e., rotating relative to the chuck, during the machining operations that may be required for finishing the article.

Thereafter, the retained portion of the burr may be removed in a simple shearing operation in which the article, particularly an article of the kind illustrated, is forced through a shearing die longitudinally. If it be not desired to utilize a portion of the retained burr for keying in subsequent machining operations, then both the burr portions 16 and 17 are sheared off clean before machining.

From the foregoing description of one specific method constituting an embodiment of this invention it will be seen that by the invention there is provided a method of finishing articles formed by welding wherein a burr is extruded at the joint in which method the article is prevented from becoming "cocked" during the cutting operations thereon because of the uneven resistance to the shear offered by the burr. In addition, the method utilizes a portion of the burr for a key in machining operations on the article and eliminates the difficulty of objectionable finishing due to the article becoming displaced during the finishing operations.

It will be obvious that various changes may be made by those skilled in the art in the details of the embodiment of the invention described above within the principle and scope of the invention as expressed in the appended claims.

We claim:

1. The method of finishing a welded article having a burr extruded at the weld during the welding operation, which method includes the steps of utilizing a portion of the burr to steady the article while removing the remainder of the burr.

2. The method of finishing a welded article having a burr extruded at the weld during the welding operation, which method includes the steps of utilizing a portion of the burr to steady the article while removing the remainder of the burr, and thereafter removing the portion of the burr utilized to steady the article.

3. The method of finishing a welded article having a burr extruded at the weld during the welding operation, which method includes steps of utilizing a portion of the burr to steady the article while removing the remainder of the burr, utilizing a retained portion of the burr for positioning the article during subsequent finishing operations, and thereafter removing the retained portion of the burr.

4. The method of finishing a welded article having a burr extruded at the joint during the welding operation, which method includes the steps of compressing the burr, utilizing a portion of the burr to steady the article while removing the remainder of the burr and thereafter removing the retained portion of the burr.

5. The method of finishing a welded article having a burr extruded at the joint during the welding operation, which method comprises the steps of simultaneously sizing the article and compressing the burr, removing the burr in a plurality of stages including shearing a portion of the burr while positioning the article with a retained portion of the burr, utilizing a retained portion of the burr for keying the article during machining operations thereon, and subsequently removing the retained portion of the burr.

6. The method of finishing a welded article having oppositely extending burrs extruded at the joint during the welding operation, which method comprises the steps of removing the burr in a plurality of stages including shearing the major portion of the oppositely extending burrs while steadying the article with minor retained portions of the oppositely extending burrs, and thereafter removing the retained portions of the burrs.

7. The method of finishing a welded article having oppositely extending burrs extruded at the joint during the welding operation, which method comprises the steps of simultaneously sizing the article and compressing the burrs, removing the burrs in a plurality of stages including shearing the major portions of the oppositely extending burrs while steadying the article with minor retained portions thereof, utilizing one of the retained portions of the burr for keying the article during machining operations thereon, and subsequently removing the retained portion of the burr.

8. The method of cold finishing a welded article having a burr extruded at the weld during the welding operation which method includes the step of forcing the article through a shearing die having a shearing edge for shearing a major portion of the burr, and utilizing the minor retained portion of the burr to steady the article during the shearing of the major portion.

9. The method of cold finishing a welded article having a burr extruded at the weld during the welding operation which method includes the step of forcing the article with a punch through a shearing die having a shearing edge for shearing a major portion of the burr, and utilizing the minor retained portion of the burr to engage the punch and steady the article during the shearing of the major portion.

10. The method of cold finishing a welded article having a burr extruded at the weld during the welding operation which method includes the steps of simultaneously sizing the article and compressing the burr, removing the burr in a plurality of stages including forcing the article through a shearing die having a shearing edge for shearing only a portion of the burr, utilizing the retained portion of the burr for steadying the article during the shearing operation, and subsequently removing the remainder of the burr.

GEORGE H. PHELPS.
GEORGE J. FRISCHMANN.